US010674862B1

(12) United States Patent
Johnson

(10) Patent No.: US 10,674,862 B1
(45) Date of Patent: Jun. 9, 2020

(54) COFFEE BREWING APPARATUS

(71) Applicant: Theodore Paul Johnson, Altoona, WI (US)

(72) Inventor: Theodore Paul Johnson, Altoona, WI (US)

( * ) Notice: Subject to any disclaimer, the term of this patent is extended or adjusted under 35 U.S.C. 154(b) by 109 days.

(21) Appl. No.: 15/949,512

(22) Filed: Apr. 10, 2018

Related U.S. Application Data

(60) Provisional application No. 62/568,215, filed on Oct. 4, 2017.

(51) Int. Cl.
  *A47J 31/44* (2006.01)
  *A47J 31/18* (2006.01)
  *A47J 31/16* (2006.01)

(52) U.S. Cl.
  CPC ............. *A47J 31/446* (2013.01); *A47J 31/18* (2013.01); *A47J 31/16* (2013.01)

(58) Field of Classification Search
  CPC ...................................... A47J 31/18
  USPC ................... 99/319, 295, 296, 323
  See application file for complete search history.

(56) References Cited

U.S. PATENT DOCUMENTS

| | | | |
|---|---|---|---|
| 2,885,290 A | 5/1959 | Abraham | |
| 3,336,857 A | 8/1967 | Knodt | |
| 4,374,026 A | 2/1983 | Greutert | |
| 4,520,716 A * | 6/1985 | Hayes | A47J 31/02 99/295 |
| 5,895,672 A | 4/1999 | Pattrick | |
| 6,561,080 B1 * | 5/2003 | Feeney | A47J 31/24 99/295 |
| 6,622,614 B1 * | 9/2003 | Smith | A47G 19/16 426/112 |
| 7,032,507 B2 * | 4/2006 | Cai | A47J 27/2105 99/317 |
| 7,958,816 B2 | 6/2011 | Lin | |
| 8,234,971 B2 * | 8/2012 | Cerroni | A47J 31/38 99/287 |
| 8,720,321 B2 | 5/2014 | Neace | |
| 9,591,942 B2 * | 3/2017 | Chiu | A47J 31/24 |
| 9,648,976 B2 * | 5/2017 | Scott | A47J 31/005 |
| 2007/0157822 A1 * | 7/2007 | Fusco | B65D 85/8043 99/295 |

(Continued)

OTHER PUBLICATIONS

Toddy, LLC, web pages related to the Toddy Cold Brew System, 2003-2018, www.toddycafe.com.

*Primary Examiner* — Nina Bhat

(57) ABSTRACT

A coffee brewing apparatus which can prepare either hot or cold coffee extract having a filter body (8) and two reservoirs (14a and 14b). The filter body 8 is a hollow cylinder with male threaded ends (10a and 10b). A mesh filter (12) is affixed to interior of the filter body (8). Two self-supporting reservoirs (14a and 14b) have female threads (16a and 16b) near their ends. Coffee grounds (18) and either hot or cold water (20) are added to one of the reservoirs. The apparatus is then assembled by joining the cylinder's male threaded ends (10a and 10b) to both reservoirs' female threaded ends. The assembled apparatus is then allowed to sit for a period of time, while coffee flavors are extracted into the water. The entire apparatus is then inverted, the mesh filter (12) removes the coffee grounds from the coffee extract (22), and the coffee extract is collected in the now lower reservoir (14a). The apparatus is disassembled for consumption of the extract, and is cleaned and reused.

1 Claim, 5 Drawing Sheets

(56) References Cited

U.S. PATENT DOCUMENTS

| | | | |
|---|---|---|---|
| 2009/0056557 A1* | 3/2009 | Lin | A47J 31/02 99/323 |
| 2011/0048240 A1* | 3/2011 | Siu | A47J 27/21041 99/285 |
| 2013/0186280 A1* | 7/2013 | Sekiguchi | A47J 31/005 99/287 |
| 2016/0015204 A1* | 1/2016 | Belanich | A47J 31/06 426/433 |
| 2016/0183713 A1* | 6/2016 | Simpson | A47J 31/0605 |
| 2017/0000289 A1* | 1/2017 | Feber | A23F 5/26 |

* cited by examiner

COFFEE BREWING APPARATUS

CROSS-REFERENCE TO RELATED APPLICATIONS

Provisional Patent Application Number: U.S. 62/568,215
Provisional Patent Filing Date: Oct. 4, 2017

BACKGROUND OF THE INVENTION

Devices for brewing coffee are well known in the art. Most commonly coffee extract is produced with electrically operated, percolation-type coffee makers. As heated water percolates through ground coffee, extract is produced which is isolated from the grounds via a paper or mesh filter into a container. Various machines automatically heat water, extract the coffee, filter out the coffee grounds, and collect the beverage in one self-contained device. These devices require a source of power to heat the water prior to brewing, require storage space, they can only produce a hot water coffee extract, and are comprised of a large number of parts.

U.S. Pat. No. 8,720,321B2 discloses an apparatus for cold brewing coffee featuring a middle unit, a brew chamber with self-contained filter, and an extract chamber. A cold-brewed coffee extract is obtained in the brew chamber. After the apparatus is inverted, gravity filtration of the coffee extract takes place, and the coffee extract is collected in the extract chamber. This apparatus requires a brew and extract chamber which must be manufactured as distinctly different units. The apparatus's brew chamber also requires a complex design in order to seal the filter inside it.

U.S. Pat. No. 5,028,328A discloses a coffee filter comprised of a mesh membrane supported by grids. The filters are cup-shaped and are a reusable replacement for paper coffee filters in popular drip coffee makers. Its use requires an electrically operated percolating coffee maker to be purchased by the consumer.

U.S. Pat. No. 2,885,290A discloses a coffee making device which seats to a conventional beverage cup. Hot water is poured into a receptacle containing coffee grounds and the coffee extract is filtered through filter paper directly into the beverage cup. This device does not allow the user to vary the brewing time, thus eliminating the possibility of extracting cold water brewed coffee extract due to the short contact time between the water and coffee grounds.

U.S. Pat. No. 6,561,080 discloses a brewing apparatus comprised of two self-supporting liquid containing reservoirs and a water permeable coffee grounds holder. This method for using this apparatus uses a screw-type motion to pressurize water in one reservoir and force the water through a water permeable member.

BRIEF SUMMARY OF THE INVENTION

The present invention is an apparatus which allows either a cold or hot water preparation of coffee extract followed by separation of the extracted coffee grounds and coffee extract by gravity filtration.

In accordance with one embodiment, a filter body is comprised of a hollow cylinder with open ends and a mesh filter secured to the interior of the cylinder. The cylinder is fitted with male treads on both ends. Two reservoirs with female threads near their open ends attach to and detach from the filter ends.

Accordingly several advantages of one or more aspects of my invention are:

a) to provide a less expensive alternative to common coffee brewing devices due to the simplicity of design and small number of parts,
b) that the two reservoirs may be identical in shape and size, reducing manufacturing costs.
c) that it is of straightforward operation and which may be cleaned and reused,
d) that it allows the consumer the option of choosing a cold or hot brew coffee,
e) that it as has the ability to vary brew times according to the consumers taste. The ability to vary brew times makes it possible to produce a cold water brewed coffee extract which is preferred by a segment of consumers,
f) that it is compact enough to be placed in a refrigerator and allow cold water extraction to take place for several hours, and
g) that either reservoir may serve as a container for beverage consumption.

DETAILED DESCRIPTION OF THE INVENTION

One embodiment of the apparatus is shown in FIGS. 1, 2, 3, and 4.

Figure 1:
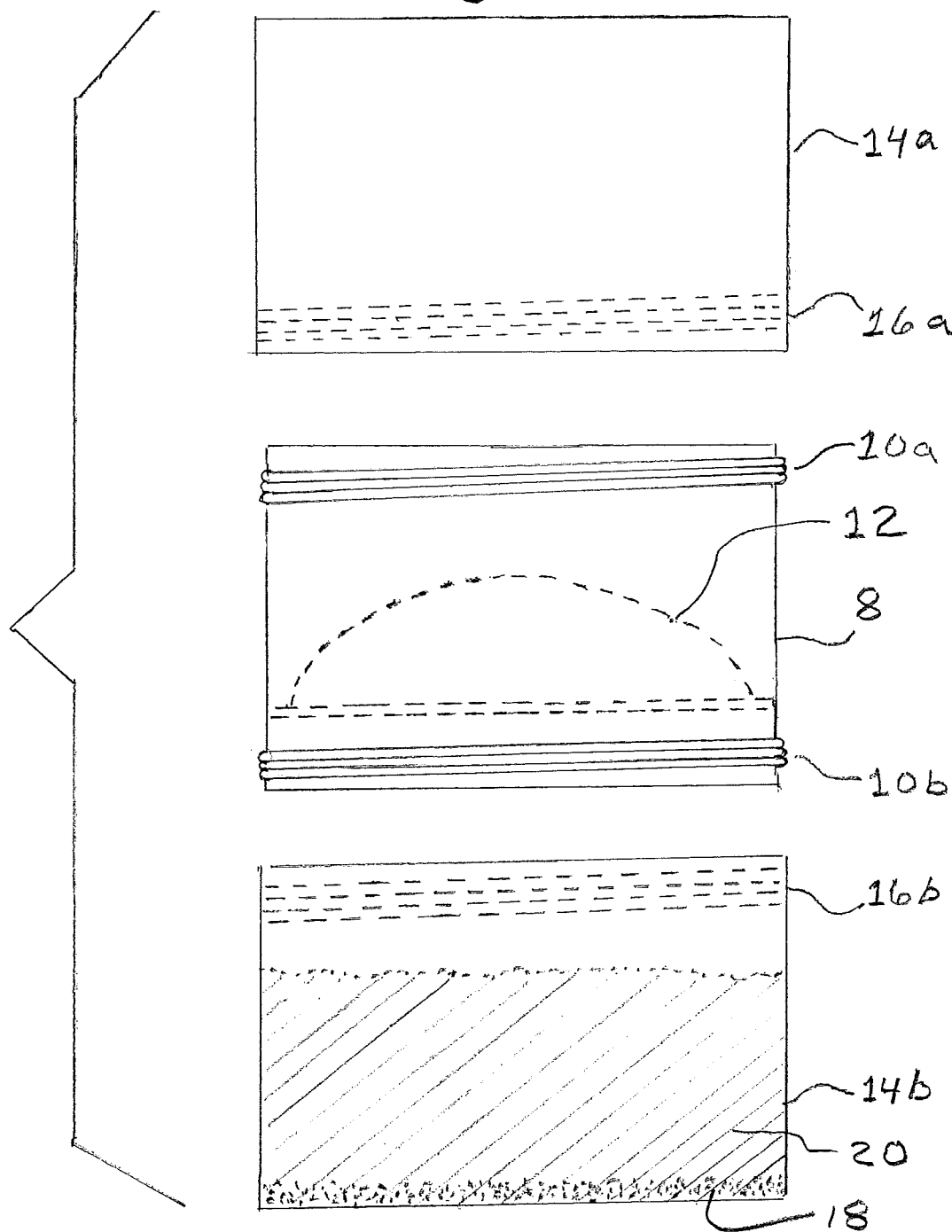
FIG. 1 shows side views of the filter body and two reservoirs before assembly.

In FIG. 1, the filter is hollow and has male threads 10a and 10b molded or cut into the exterior circumference of each of the filter body 8 ends. A mesh filter 12 is affixed by adhesion or welding to the interior of the filter body 8. Two self-supporting reservoirs 14a and 14b have female threads 16a and 16b molded or machined into the interiors, near the open ends. These threads mate with the filter body's male threaded ends 10a and 10b, which form a hermetic seal when assembled. Coffee grounds 18 and water 20 are shown contained in one reservoir 14b.

Figure 2:
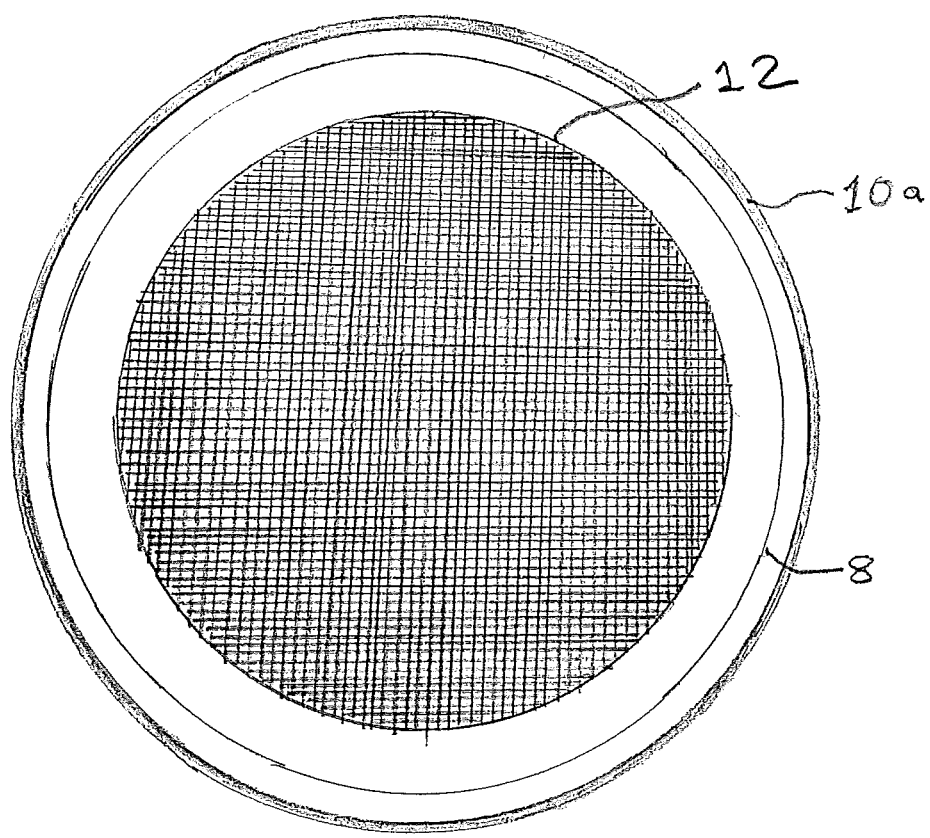
FIG. 2 shows a top view of the filter body.

In FIG. 2, a top view of the filter body is shown, with male threads 10a and mesh filter 12.

Figure 3:
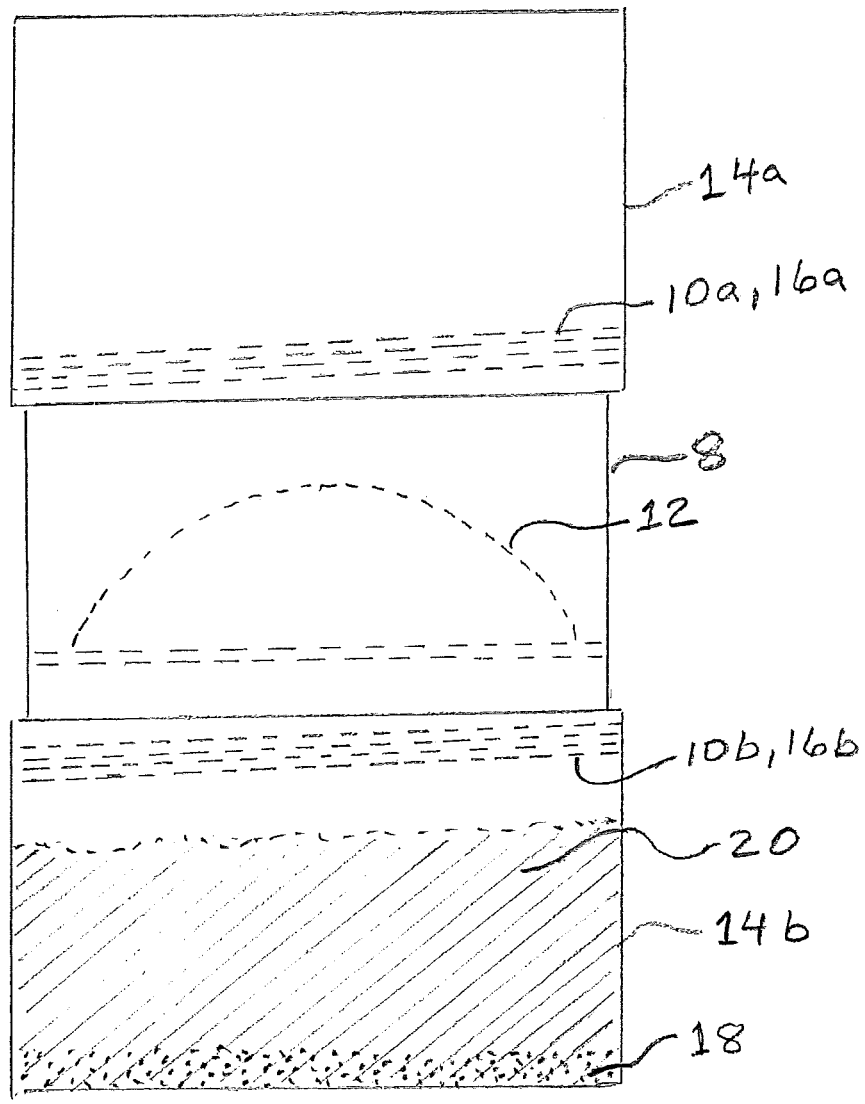
FIG. 3 shows a side view of the assembled filter body and reservoirs.

FIG. 3 shows the assembled filter body 8 and reservoirs 14a and 14b with water 20 and coffee grounds 18 contained in one reservoir.

Figure 4:
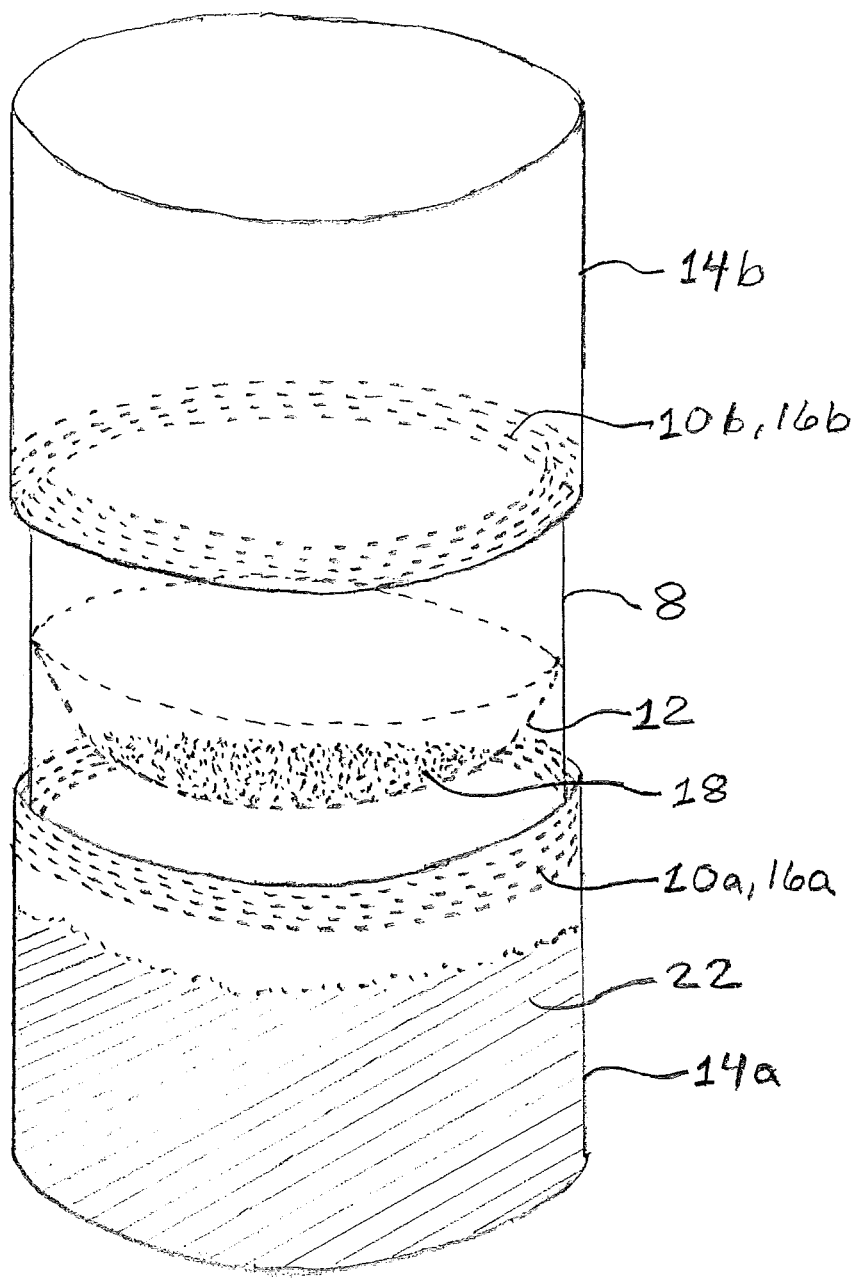
FIG. 4 shows a perspective view of the inverted assembled filter body and reservoirs with removed coffee grounds and coffee extract.

FIG. 4 shows a perspective view of the assembled and inverted filter body 8, mesh filter 12, reservoirs 14a and 14b, coffee grounds 18, and coffee extract 22.

Figure 5:
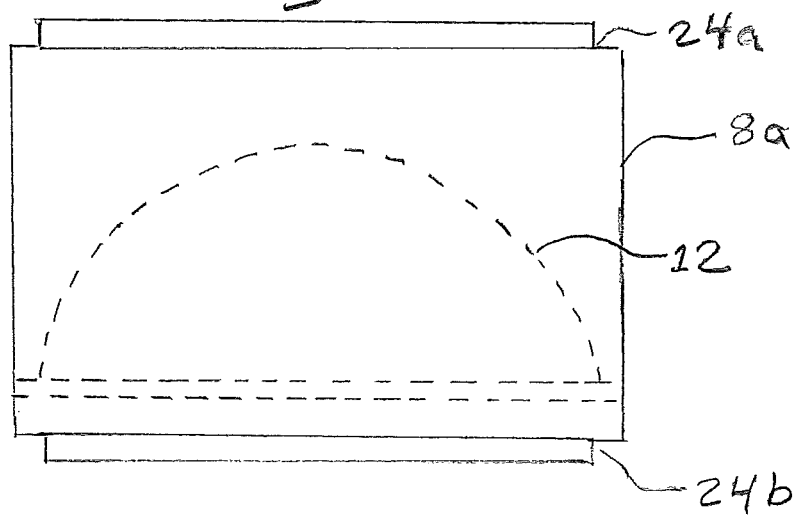
FIGS. 5 and 6 show side views of the filter body with alternative seal designs.

FIG. 5 shows another embodiment of the filter body 8a having recesses 24a and 24b molded or cut into the exterior circumference of the filter body's top and bottom ends. These recesses may mate to the interior surface at the open end of two reservoirs by a close fit and form a hermetic seal.

Figure 6:
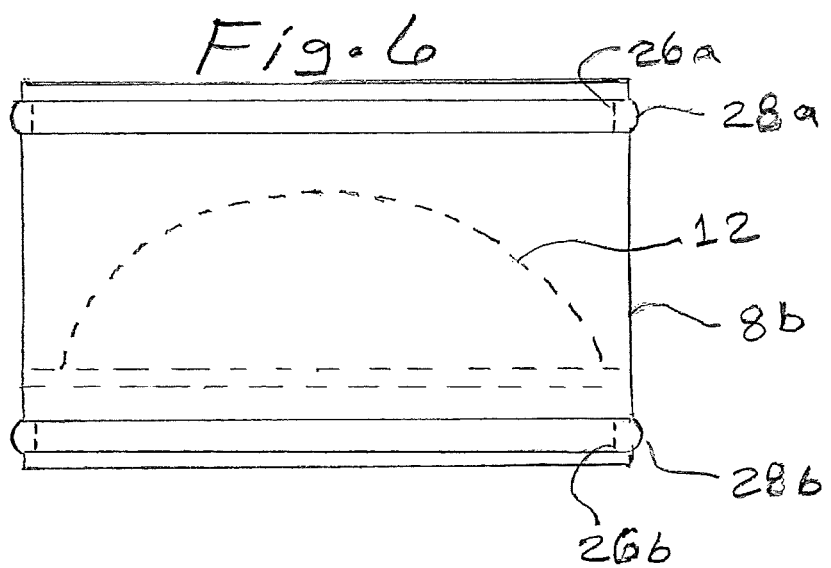

FIG. 6 shows another embodiment of the filter body 8b having notches 26a and 26b molded or cut into the outer circumference near the top and bottom of the filter body's ends which are fitted with rubberized O-rings 28a and 28b. These o-rings may mate to the interior surface at the open end of two reservoirs and form a hermetic seal.

Operation.

Ground coffee 18 and either hot or cold water 20 are added to a lower reservoir 14b. The amount and proportions of ground coffee and water, as well as the temperature of the water, may be varied by the consumer. The male threads 10b of the filter body 8 are then attached to the female threads 16b of the lower reservoir 14b. The female threads 16a of the upper reservoir 14a are then attached to the male threads 10a of the filter body 8. The ground coffee and water are allowed to mingle for an amount of time desired to produce coffee extract and to achieve the taste preferred by the consumer. During this time, the entire apparatus may also be kept at a cool temperature if cold brewed coffee is to be produced. The two reservoirs 14a and 14b and filter body 8 are then inverted as one unit to allow the coffee extract 22 to be separated from the coffee grounds 18 by gravity filtration, and collect into the now lower reservoir. The filter body 8 is then removed from the two reservoirs 14a and 14b and cleaned for reuse.

The description above should not be construed as limiting in scope of the embodiments but as merely providing illustrations of some of several embodiments. For example, the mesh filter can have other shapes other than shown in the drawings such as cylindrical or cone shaped; the reservoirs can have alternate dimensions, such as varying the height to diameter ratio; the ratio of the filter body size to the reservoirs can be varied, etc.

The invention claimed is:

1. A coffee brewing filter body comprising:
   a) a first reservoir, having an open end and a closed end, for containing water and coffee grounds, being self-supporting on the closed end;
   b) a second reservoir, having an open end and a closed end, for containing coffee extract, being self-supporting on the closed end;
   c) a filter body, comprising a hollow cylinder having a first and second open end, one first end for temporary attachment to the open end of said first reservoir, one second end for temporary attachment to the open end of said second reservoir, and a mesh filter for filtering of extracted coffee grounds disposed within the middle interior wall of said filter body; and
   d.) a seal for preventing water from leaking between said first reservoir and said second reservoir wherein said seal is disposed between the interior surface of said first and second reservoirs forming a hermetic seal;
wherein said filter body includes male threaded ends which is in operative connection with a mesh filter, said two reservoirs include female threads which threadingly connect to the male ends of the filter body when assembled or disassembled.

* * * * *